United States Patent
Kim

(10) Patent No.: US 6,877,754 B2
(45) Date of Patent: Apr. 12, 2005

(54) REAR SUSPENSION CONNECTING PART STRUCTURE UNDER THE FLOOR OF A VEHICLE

(75) Inventor: Ki-Chang Kim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 87 days.

(21) Appl. No.: 10/329,135

(22) Filed: Dec. 23, 2002

(65) Prior Publication Data

US 2003/0160415 A1 Aug. 28, 2003

(30) Foreign Application Priority Data

Feb. 22, 2002 (KR) .......................................... 2002-9534

(51) Int. Cl.[7] .............................................. B62D 21/11
(52) U.S. Cl. ............................... 280/124.109; 280/784; 280/788
(58) Field of Search ................................. 280/784, 788, 280/124.109, 785; 296/146.1, 184.1, 204

(56) References Cited

U.S. PATENT DOCUMENTS

| | | | | |
|---|---|---|---|---|
| 3,704,029 A | * | 11/1972 | Bailleux | 280/124.109 |
| 4,562,898 A | * | 1/1986 | Huang | 180/292 |
| 5,114,184 A | * | 5/1992 | Shimomura et al. | 280/784 |
| 5,180,206 A | | 1/1993 | Toyoda | |
| 5,222,758 A | | 6/1993 | Sakai et al. | |
| 5,567,005 A | * | 10/1996 | Kosuge et al. | 296/204 |
| 5,899,498 A | * | 5/1999 | Horton | 280/781 |
| 6,109,653 A | * | 8/2000 | Maruyama et al. | 280/781 |
| 6,237,304 B1 | * | 5/2001 | Wycech | 52/731.6 |
| 6,349,953 B1 | * | 2/2002 | Yoshihira et al. | 280/124.109 |
| 6,434,907 B1 | * | 8/2002 | Simboli | 52/731.6 |
| 6,547,281 B1 | * | 4/2003 | Iwatsuki | 280/785 |
| 6,550,847 B2 | * | 4/2003 | Honda et al. | 296/146.6 |
| 6,641,168 B2 | * | 11/2003 | Heise et al. | 280/781 |
| 6,679,523 B2 | * | 1/2004 | Yamamoto et al. | 280/785 |
| 6,685,202 B2 | * | 2/2004 | Fujimoto | 280/124.109 |
| 6,702,309 B2 | * | 3/2004 | Cho | 280/124.166 |

* cited by examiner

Primary Examiner—Paul N. Dickson
Assistant Examiner—Toan C To
(74) Attorney, Agent, or Firm—Morgan Lewis & Bockius LLP

(57) ABSTRACT

A rear suspension connecting structure located under the floor of a vehicle wherein one horizontal reinforcement member is employed at an inner side of the rear floor side member. A weld pipe, for receiving an entire shank of a bolt, is coupled to an upper side of the reinforcement, and the weld pipe is coupled to a vertical bulkhead coupled along the width of the reinforcement.

3 Claims, 3 Drawing Sheets

REAR SUSPENSION CONNECTING PART STRUCTURE UNDER THE FLOOR OF A VEHICLE

FIELD OF THE INVENTION

The present invention relates to the rear suspension of a vehicle. More particularly, the present invention relates to the rear suspension connecting and support structure of a vehicle.

BACKGROUND OF THE INVENTION

Conventional rear wheel assemblies of a vehicle include rear suspension components and hub and brake assemblies. Furthermore, knuckles attach the hub and brake assemblies to the vehicle and to a cross member. The cross member is typically mounted with the floor of the vehicle.

The floor of the vehicle is typically configured with a rear floor side member that is coupled to a rear floor cross member. A reinforcement piece is coupled inside the rear floor side member and to the floor of the vehicle. A second reinforcement is coupled to the reinforcement piece. Nuts, welded to square brackets are used to hold the components together and the square brackets are then welded to the second reinforcing member. Furthermore, a third reinforcement is welded on top of the welded nuts. The rear floor cross member is also welded to a fourth and a fifth reinforcement for additional strength. Finally, bolts are inserted through the cross member and coupled with the nuts, thereby attaching the floor panel to the upper surface of the cross member.

A drawback in the conventional structure is that there is such a plurality of components that the cost of manufacture is increased, excessive manufacture time is lost, excessive resources are expanded and the weight of the vehicle is increased.

Another drawback is that the bolts, for coupling the cross member and the rear floor side member are mounted to relatively short welded nuts. The short nuts result in the shank of the bolts not being stably held. This enables the vibration from the engine and road to propagate into the driver's compartment.

SUMMARY OF THE INVENTION

The present invention provides a rear suspension connecting structure for a vehicle adapted to reduce the number of parts required and the manufacturing and assembly cost of the vehicle. Furthermore, the present invention reduces the weight of the rear suspension connecting structure, while maintaining sufficient strength.

The present invention further provides a rear suspension connecting structure that may be located under the floor of a vehicle and adapted to stably hold an entire shank of a mounting bolt. This improves the stability of a mounted cross member equipped with a rear suspension and a rear floor side member, thereby reducing the transmission of vibration.

In accordance with an embodiment of the present invention, there is provided a rear suspension connecting structure of a vehicle wherein a rear floor cross member is welded to a lateral portion of a rear floor side member. The rear floor side member is strutted by a flange formed at an end of the rear floor cross member. A reinforcement, having a length corresponding to a width of the rear floor cross member, is welded to an inner floor surface of the rear floor side member. A weld pipe, formed with a female screw at a minor diameter, is welded to a position formed by a bolt hole of the reinforcement. The bolt hole is configured such that an entire shank of a bolt can be fastened. The weld pipe is encompassed by and welded at one side to a bent part of a vertical bulkhead traversing a crosswise direction of the rear floor cross member. The rear floor cross member is equipped with a reinforcement which is both welded to a lateral part of the rear floor side member and is centrally formed with a reinforced incline.

In the present invention, the number of reinforcements is decreased, thereby reducing the cost of materials, assembly process, and weight of the vehicle. However, the strength of the system is maintained sufficiently secure by the vertical bulkhead. Furthermore, the mounting strength of the bolts is improved via a weld pipe holding the entire shank of the bolt, thereby securely connecting the rear floor side member to a cross member of the rear suspension and reducing vibration.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
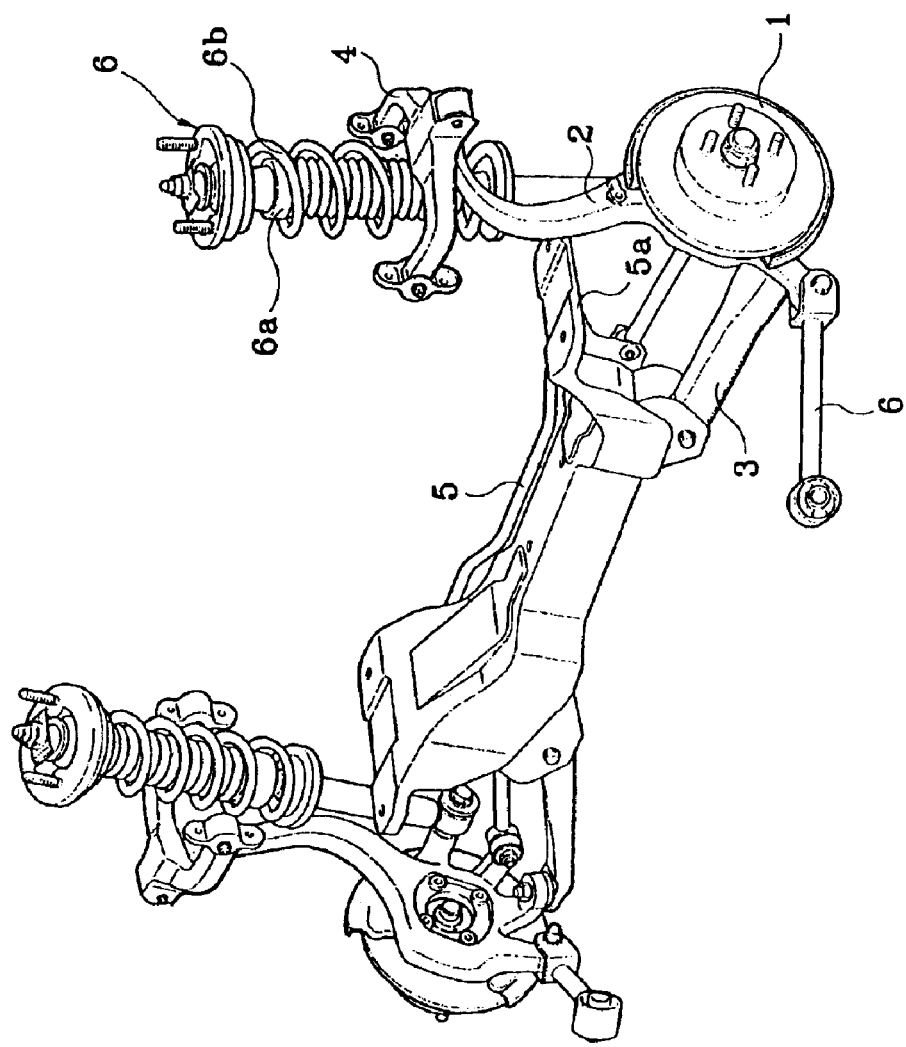
FIG. 1 is a perspective view of a rear suspension of a vehicle.

As shown in FIG. 1, a typical rear suspension connecting structure includes generally a cross member that interconnects the wheel attaching components, brake components, and the suspension.

Figure 2:
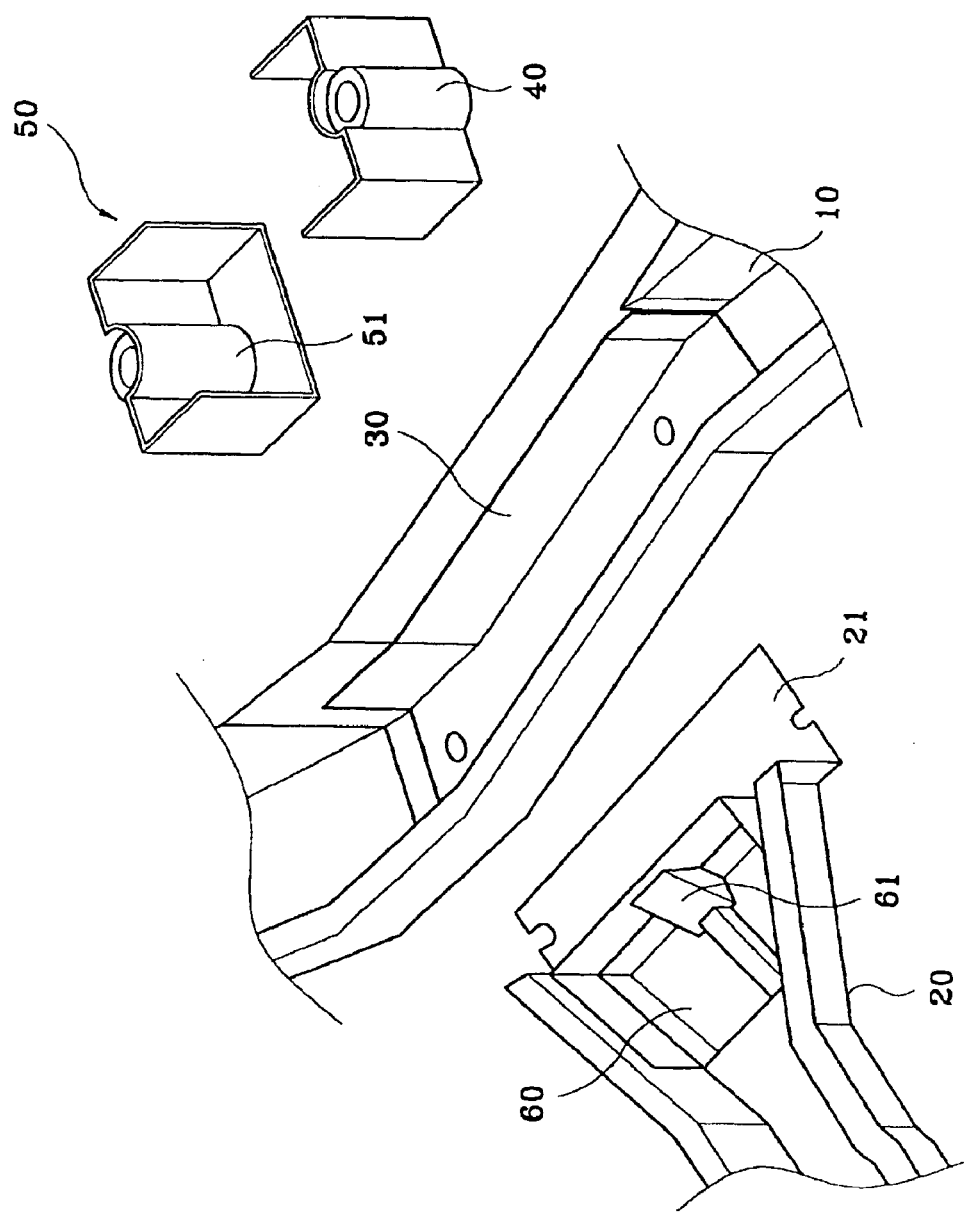
FIG. 2 is an exploded perspective view of an embodiment of a rear suspension connecting structure of a floor of a vehicle according to an embodiment of the present invention.
Figure 3:
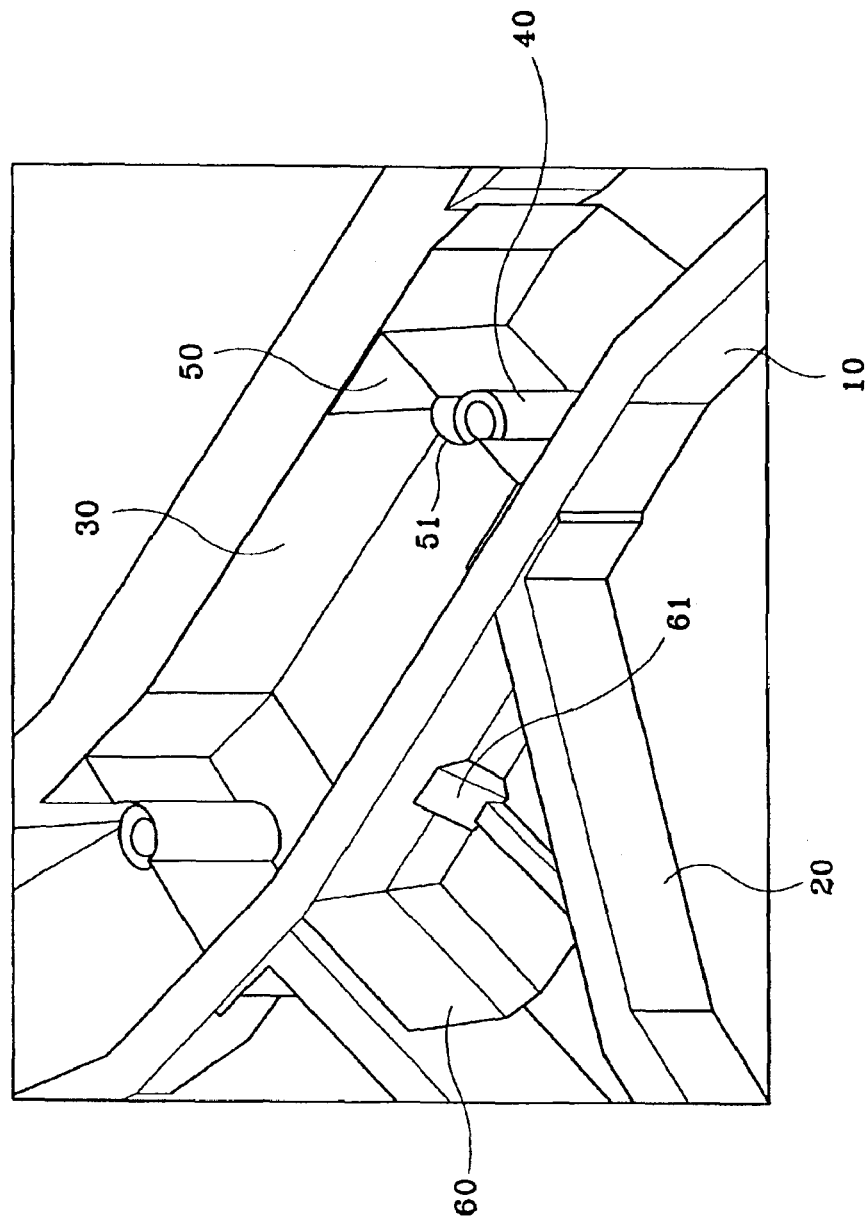
FIG. 3 is a schematic view of the assembled rear suspension connecting structure of a vehicle according to an embodiment of the present invention.

Referring to FIGS. 2 and 3, a rear suspension connecting structure that connects under the floor of a vehicle according to an embodiment of the invention includes a rear floor side member 10 that defines each end of the floor panel rear portion (not shown). A rear floor cross member 20 is included and connects to the rear floor side member 10. A first reinforcement 30 is welded to an inner floor surface of the rear floor side member 10. Weld pipe 40 is welded to the front and rear part of the reinforcement 30. The weld pipe 40 also has female screw threads for receiving a bolt. A vertical bulkhead 50 is configured to encompass one side of the weld pipe 40 and positioned within the rear floor side member 10. Also, a second reinforcement 60 is coupled to an inner surface of the rear floor cross member 20 and to the lateral surface of the rear floor side member 10.

The rear floor side member 10 has a U-shape in cross-section. The first reinforcement 30 also has a U-shape in cross-section, such that the rear floor side member 10 and the first reinforcement 30 fit together. Following placing the first reinforcement 30 within the floor side member 10, they are jointly coupled to the floor surface. Furthermore, the first reinforcement 30 is coupled to the floor side member 10, such that bolt holes in the first reinforcement 30 remain properly aligned with bolt holes in the floor side member 10.

The weld pipe 40 is coupled with an upper surface of the first reinforcement 30 so that the inner open diameter of the weld pipe 40, which contains the female screw threads, corresponds with the bolt holes in the first reinforcement 30 and the floor side member 10. The weld pipe 40 is configured to be tall enough to accommodate the portion of a bolt that is protruded above the upper side of the reinforcement 30 from under the vehicle. That is, the shank of the bolt that protrudes above the reinforcement 30, is entirely received by the female screw threads of the weld pipe 40.

The vertical bulkhead 50 has flanges that couple to both the lateral surfaces and the base surface of the first reinforcement 30 held within the floor side member 10. Furthermore, a center portion of the vertical surface is formed with semi-circled bend portion 51. This semi-circular bend portion 51 receives and couples with the weld pipe 40.

In a preferred embodiment the floor cross member 20 is trapezoidal in shape near where it connects to the rear floor side member 10. Furthermore, the floor cross member 20 is formed with a flange 21 that is coupled to the rear floor side member 10.

It is preferred that the trapezoid-shaped section of the rear floor cross member 20 is configured to receive a second reinforcement 60. The second reinforcement 60 substantially matches the shape of the rear floor cross member 20, such that it fits within said rear floor cross member 20 (FIG. 2). A floor surface and the vertical surfaces of the trapezoid-shaped second reinforcement 60 are coupled to the matching floor surface and vertical surfaces of the rear floor cross member 20. In a preferred embodiment the rear floor cross member 20 and is configured with an incline surface 61 for coupling to the second reinforcement 60.

Hereinafter, the operation and effect of the present invention will be described.

The vertical bulkhead 50 supports the weld pipe 40 to fully support bolts that connect the components to the vehicle body. Furthermore, the weld pipe 40 supports the bolts from vibration.

In a preferred embodiment of the invention, the strength of the rear suspension connecting unit is sufficient by the particular placement of the reinforcement members. One horizontal reinforcement 30 and one vertical bulkhead 50 are used to secure the rear suspension connecting unit to the vehicle body. The flange formed underneath the vertical bulkhead 50 functions as a horizontal reinforcement and the vertical surfaces thereof function as another reinforcement. The mid-section of the vertical surface is strutted by the weld pipe 40 such that the vertical bulkhead 50 and the weld pipe 50 are mutually supported and therefore reinforce the strength of the unit.

In a further preferred embodiment the strength of the end of the rear floor cross member mounted with the rear floor side member and rear suspension. In the present invention, the shank of the bolt is entirely grasped by the weld pipe 40 and the weld pipe 40 is supported by the vertical bulkhead 50. This enables sufficient restraint of the bolts from movement in the left and right directions, as well as to forward and backward movement. The end of the rear floor cross member mounted with the rear floor side member and the rear suspension is coupled tightly. Therefore, forces are effectively dispersed and shocks and vibrations are effectively absorbed.

The foregoing description of embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A rear suspension connecting structure, comprising:

a rear floor side member;

a rear floor cross member vertically connected to the rear floor side member;

a first reinforcement welded to an inner side of said rear floor side member and formed with a bolt hole;

a weld pipe formed with a female screw corresponding to the bolt hole and coupled to the first reinforcement;

a vertical bulkhead coupled along the width of said rear floor side member and formed with a semi-circular bent portion at a midsection thereof for encompassing and coupling the weld pipe;

a second reinforcement coupled to an inner side of said rear floor cross member and a lateral portion of said rear floor side member.

2. The structure of claim 1, wherein said weld pipe has a length capable of accommodating an entire shank of a bolt inserted from the under side of the vehicle.

3. The structure of claim 1, wherein an end portion of said rear floor cross member is formed in a trapezoidal fashion and a surface coupled to said rear floor side member of said reinforcement is formed with an incline.

* * * * *